(12) United States Patent
Wang et al.

(10) Patent No.: US 7,741,606 B2
(45) Date of Patent: *Jun. 22, 2010

(54) MOTOR DRIVEN VARIABLE OPTICAL ATTENUATOR WITH IR SENSOR CLOSED-LOOP CONTROL

(75) Inventors: Xinzhong Wang, Cupertino, CA (US); Yao Li, Fremont, CA (US); Andy Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/058,666

(22) Filed: Mar. 29, 2008

(65) Prior Publication Data

US 2009/0242772 A1    Oct. 1, 2009

(51) Int. Cl.
*G01J 5/02* (2006.01)
(52) U.S. Cl. .................. 250/348; 385/140
(58) Field of Classification Search .......... 250/348; 385/140

See application file for complete search history.

(56) References Cited

U.S. PATENT DOCUMENTS

| | | | |
|---|---|---|---|
| 4,545,659 A * | 10/1985 | Swinehart et al. | 352/216 |
| 5,701,525 A * | 12/1997 | Caterino et al. | 396/132 |
| 7,504,630 B2 * | 3/2009 | Wang et al. | 250/338.1 |
| 7,529,459 B1 * | 5/2009 | Wang et al. | 385/140 |
| 2001/0036333 A1 * | 11/2001 | Kasuga et al. | 385/19 |
| 2002/0146201 A1 * | 10/2002 | Suzuki et al. | 385/19 |

* cited by examiner

*Primary Examiner*—David P Porta
*Assistant Examiner*—Shun Lee
(74) *Attorney, Agent, or Firm*—Wuxi Sino-US IP Agency, Ltd.; Joe Zheng

(57) ABSTRACT

Attenuators used to regulate optical signals are disclosed. According to one aspect of the present invention, an assembly including an IR source and an IR sensor is provided to sense blockage of optical signals transmitted between two collimators via a fixed common light blocker that is driven by a stepper motor. The movement of the light blocker is sensed by a sensing assembly including an IR source and IR sensor. By detecting the photocurrent from the IR sensor and a feedback circuit, the attenuation of the optical signals can be well controlled.

21 Claims, 15 Drawing Sheets

(a)

(Prior Art)

(b)

(Prior Art)

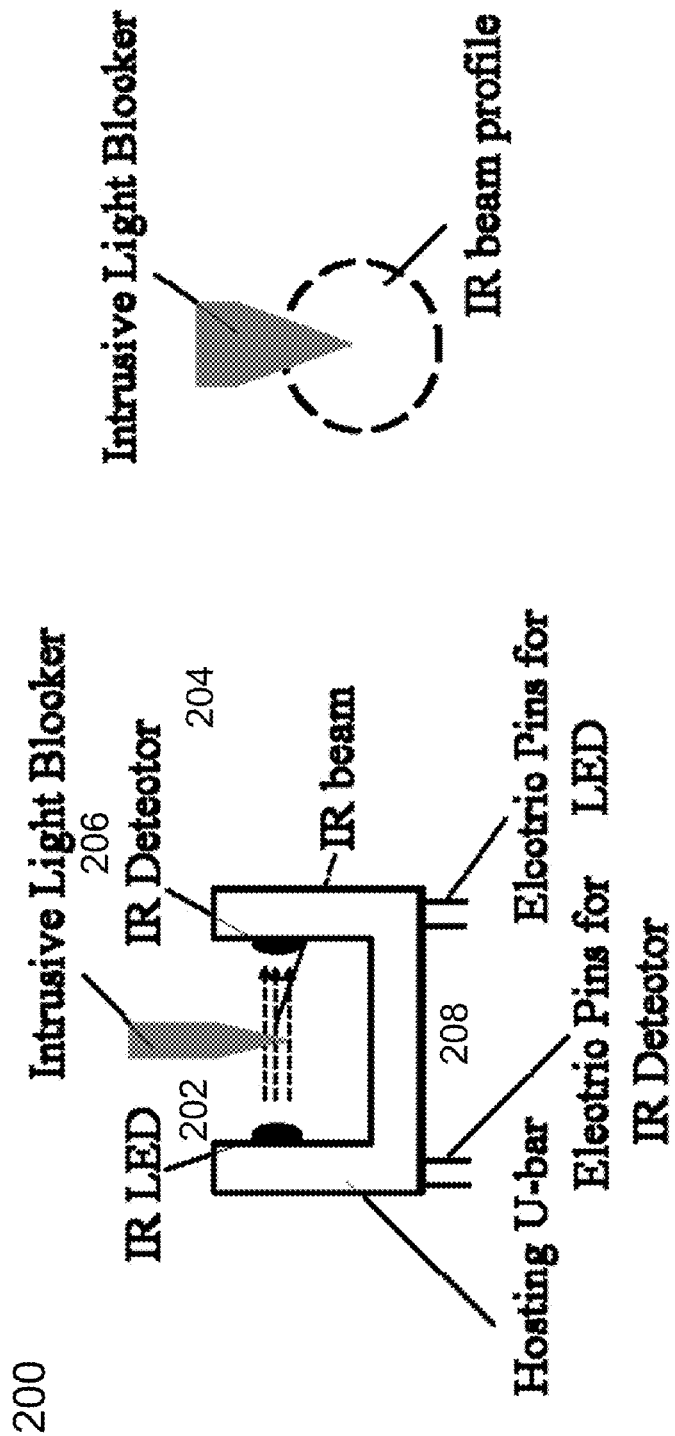
FIG. 2A
FIG. 2B

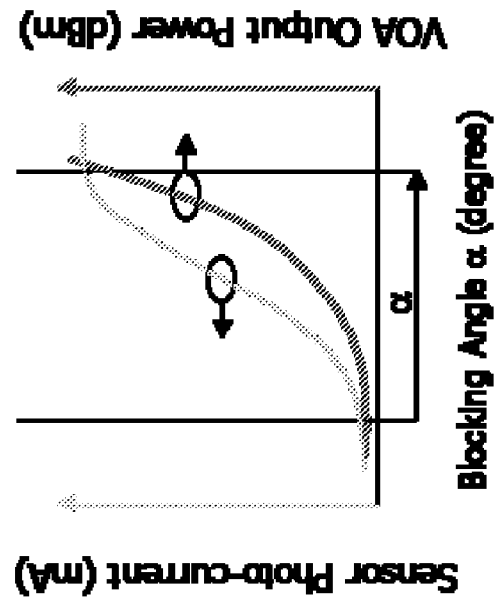
*FIG. 14B*
*FIG. 14C*

MOTOR DRIVEN VARIABLE OPTICAL ATTENUATOR WITH IR SENSOR CLOSED-LOOP CONTROL

BACKGROUND OF THE INVENTION

1. Field of the Invention

The invention is generally related to the area of optical communications. In particular, the invention is related to a motor driven variable optical attenuator with IR sensor closed-loop control.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networks.

In general, the channel signals come from different sources and may have transmitted over different mediums, resulting in different power levels. Without equalizing the power levels of the channel signals that are to be combined or multiplexed, some channels in a multiplexed signal may be distorted as a result of various stages of processing the multiplexed signal. On the other hand, many optical devices or systems would not function optimally when incoming signals are beyond a pre-determined signal level range. In fact, the power of the incoming signals shall not be too low, neither too high. To ensure that all optical devices or systems receive proper levels of optical signals, attenuation devices are frequently used to adjust the optical signals before they reach an optical device.

Many existing optical attenuation devices are open loop controlled due to lack of internal accuracy feedback signal. An electrical tuning variable optical attenuator (EVOA) is capable of quickly controlling the optical signal power. However, many of EVOA developed so far are either based on MEMS, or by moving a ND filter driven by a stepping motor with gear reduction mechanics and a potentiometer for positions, or waveguide based VOAs. While the ND filter based approach suffers from a slow adjustment speed and a high cost of components such as the ND filter and supporting optics and mechanics, the MEMS or other non-ND-filter approaches typically are too sensitive to have a fine attenuation resolution, and good device assembly repeatability. Waveguide VOAs are suitable for high channel-count integration, but have the issues of high polarization dependent loss, sensitive to ambient temperature. Their use in an open loop control often results in these undesired issues, such as high temperature-dependent loss, performance and reliability issues, rendering the shortening of their service life cycle.

To solve most of these issues, a closed-loop control has been applied by adding an EVOA and a tap optical filter or coupler together with a photo-detector (PD) as a sensor, as shown in FIG. 1A and FIG. 1B, respectively. The combination of tap and PD generates a small photocurrent proportional to the output intensity from the EVOA. Such a current serves as a feedback signal to further adjust the EVOA so as to meet the attenuation requirement. Such a tap-PD based EVOA design is often adopted in many optically devices or systems. However, the external feed-back mechanism makes an overall system higher in cost and introduces higher insertion loss and often makes the final system bulky.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to designs of motor-driven attenuators that can be advantageously used to regulate optical signals according to pre-defined requirements. According to one aspect of the present invention, an assembly including an IR source and an IR sensor is provided to sense blockage of optical signals transmitted between two collimators via a fixed common light blocker that is driven by a stepper motor or stepping motor. The movement of the light blocker is sensed by a sensing assembly including an IR source and IR sensor. By detecting the photocurrent from the IR sensor and a feedback circuit, the attenuation of the optical signals can be well controlled via the feedback circuit that generates a control signal to control the stepper motor.

Various designs of the common light blocks are disclosed. Depending on the designs and operations of the common light blocks, the attenuators in accordance with the present invention provide what is referred to herein as complementary attenuation or reverse attenuation, each leading to different benefits and features. In addition, an exemplary feedback mechanism is provided to generate a control signal to control the movement of the stepper motor that in return controls the movement of the light blocker.

The present invention may be implemented as a method, an apparatus or a part of a system. According to one embodiment, the present invention is an attenuator comprising: a compact housing; an input collimator and an output collimator as interfaces of the compact housing; an assembly structure housed in the compact housing and including an IR source and an IR sensor; a light blocker actuated by a stepper motor to block some or all of the light beam projected from the input collimator to the output collimator according to an attenuation requirement, where a movement of the light blocker is sensed by the sensing assembly to indicate how much the light beam has been attenuated.

There are numerous benefits, features, and advantages in the present invention. One of them is the controlled and precise attenuation via an IR sensor with a feedback control so as to compensate for some environmental factors such as temperature changes, and vibration.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2A shows an exemplary sensing assembly that can be used in one embodiment of the present invention;

FIG. 2B illustrates an IR beam being intruded;

FIG. 14B is provided to explain the basic geometry of light blocking, and FIG. 14C depicts the IR sensor photo current and VOA output in relation with a blocking angle respectively.

DESCRIPTION OF THE PREFERRED EMBODIMENTS

Figure 1A:
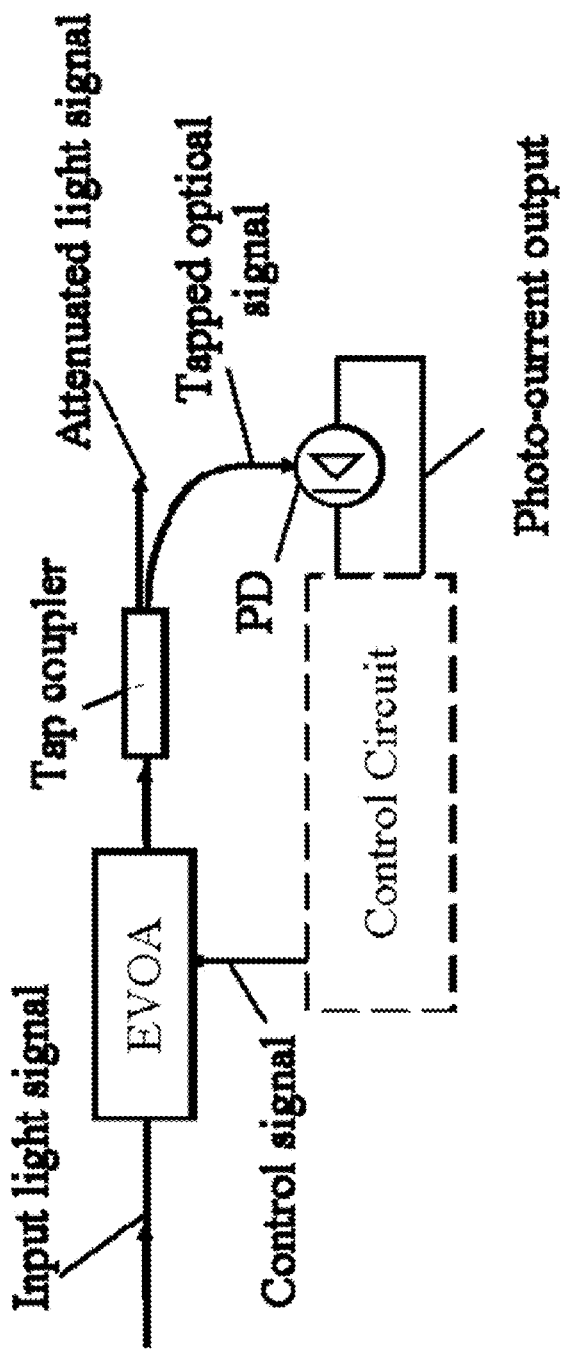
FIG. 1A and FIG. 1B show, respectively, an EVOA using a tap optical filter or coupler together with a photo-detector (PD) as a sensor.
Figure 1B:
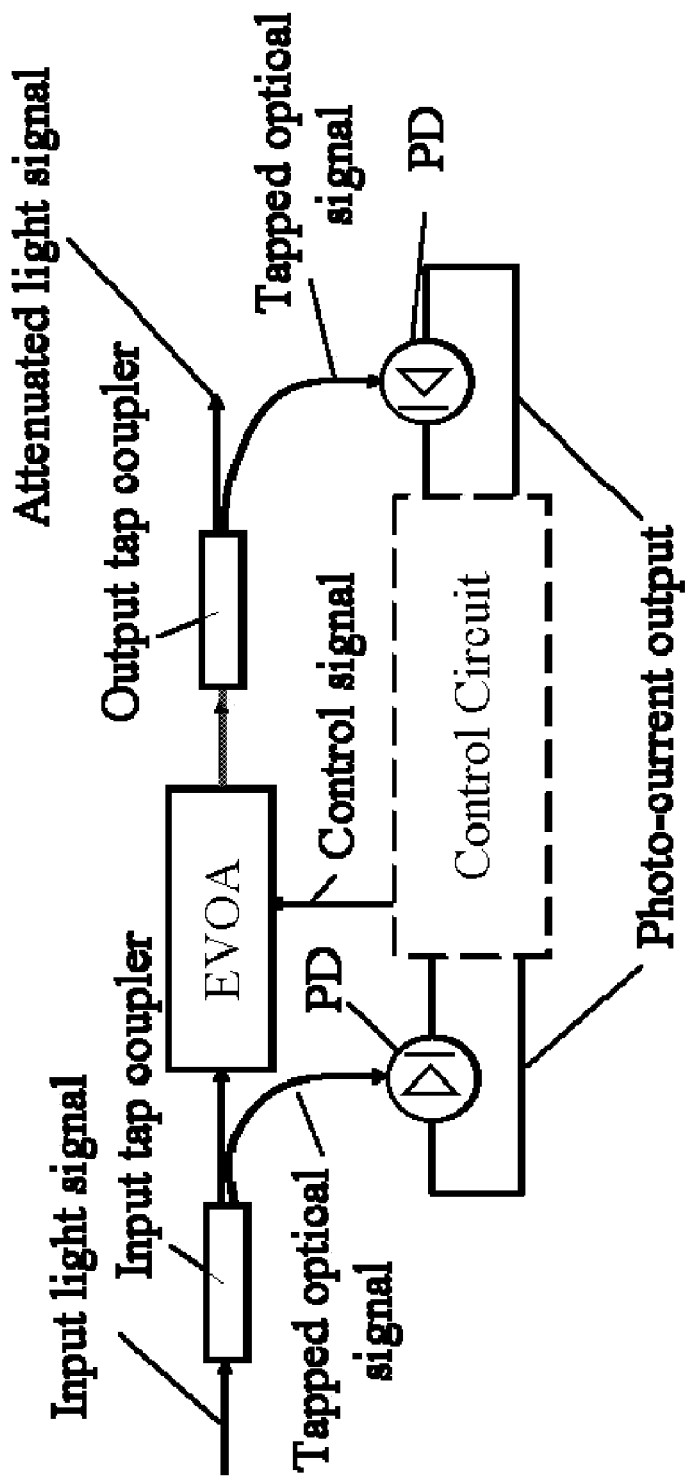
Figure 3:
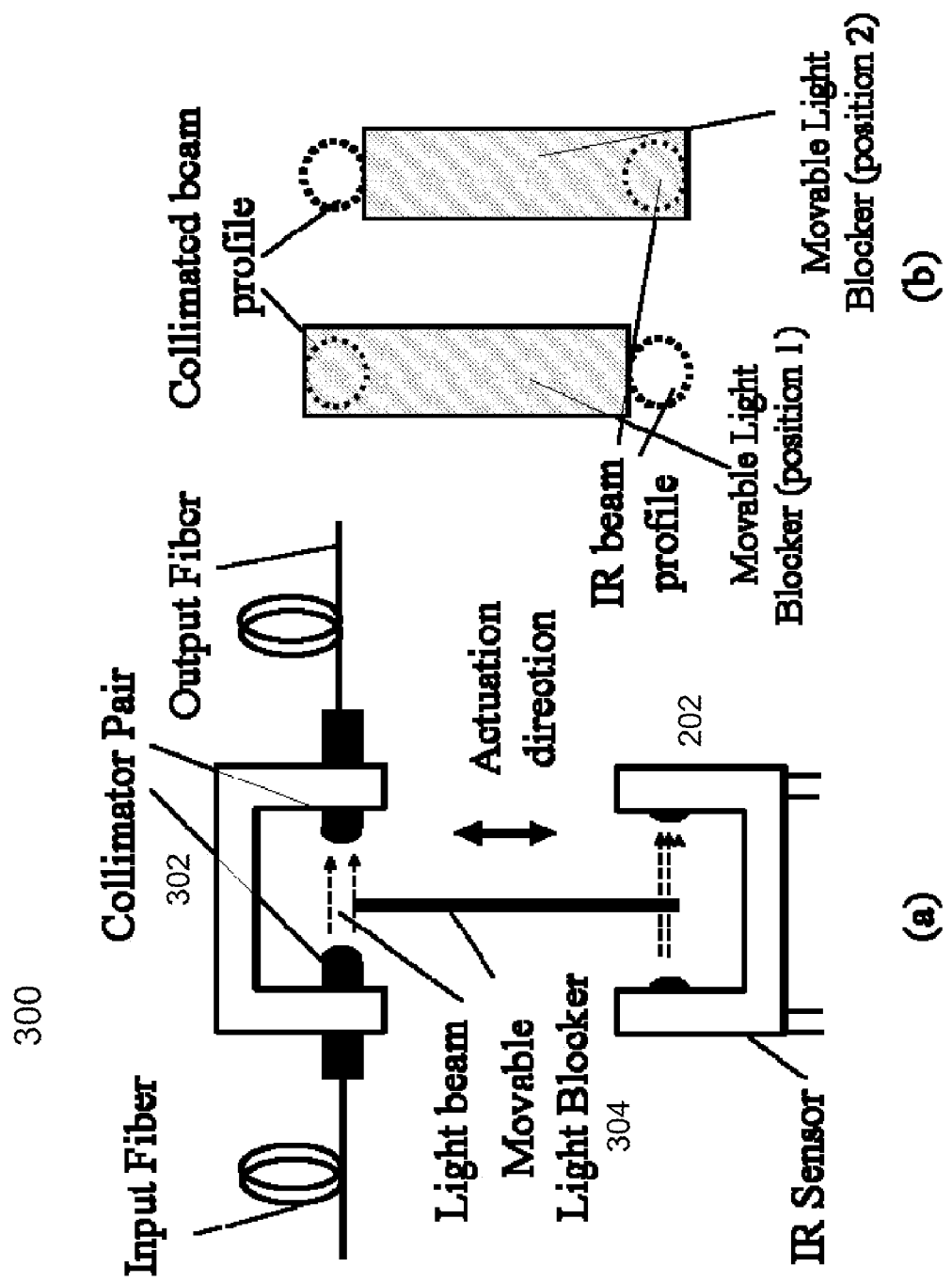
FIG. 3A shows an exemplary embodiment of a VOA employing the assembly of FIG. 2A in accordance with the present invention.
FIG. 3B illustrates two extreme cases of FIG. 3A.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-15. However, those skilled in the art will readily appreciate that the detailed description given herein with respect to these figures is for explanatory purposes as the invention extends beyond these limited embodiments.

FIG. 2A shows an exemplary assembly 200 that can be used in one embodiment of the present invention. The assembly 200, also referred to as a sensing assembly, includes an infrared (IR) LED 202, a commercial low-cost and compact infrared (IR) sensor 204, and an intrusive light blocker 206. To position the LED 202 and the sensor 204 properly, a U-shaped structure 208 is used so that a fixed distance between the LED 202 and the sensor 204 is always maintained. In one embodiment, the LED 202 and the sensor 204 are housed in a molded compact plastic enclosure that may be massively manufactured and deployed in various environments, such as cars, home appliances, home electronics and office appliances.

The intrusive light blocker 206 can be driven downwards or upwards. When the intrusive light blocker 206 is present in an optical path from the LED 202 to the sensor 204, at least some of the IR beam from the LED 202 will be blocked. The sensor 204 generates a stable photocurrent proportional to the amount of the power of an IR beam being detected by the sensor 204. Depending on how much the blocker 206 is inserted into the way of the IR beam, the sensor 204 reports a changed photocurrent proportional to the amount of the IR beam being blocked. Thus, the IR sensor 206 can be used to track a one-dimensional movement of an object (e.g., the intrusive light blocker 206) if the shape of such an object is known and fixed.

To better illustrate the operation of the IR sensor 204, FIG. 2B shows a projected view of a round IR beam profile along with a light blocking object partially inserted. As the object 206 moves vertically down into the beam, the amount of the IR beam blocked will change from none to all, and the corresponding photocurrent from the IR Sensor (e.g., through its output pin) will be from a maximum value to zero. For a known object, this monotonic change of the photocurrent can then be used to calculate the position of the object (namely, the intrusive light blocker's vertical position) when the shape thereof is known and fixed.

Based on the assembly 200, a variable optical attenuator (VOA) may be constructed according to one embodiment. FIG. 3A shows an exemplary embodiment 300 of a VOA employing the assembly 200. The VOA 300 includes a pair of fiber optic collimators 302. The two collimators 302 are kept away from each other by a fixed distance (namely there is a free space gap between them). One of the two collimators 302 projects a collimated beam to another one of the collimators 302. A common light blocker 304 is provided and actuated by an actuation means (e.g., a motor) to be moved up and down. As shown in FIG. 3A and FIG. 3B, when the common light blocker 304 is moved up, the collimated beam transmitted between the two collimators 302 is gradually blocked. On the opposite, when the common light blocker 304 is moved down, the collimated beam transmitted between the two collimators 302 is gradually released from being completely blocked to not being blocked at all. FIG. 3B shows two extreme cases in which the common light blocker 304 is moved up to completely block the light beam and moved down to completely unblock the light beam. The embodiment in FIG. 3A is one of the embodiments providing complimentary attenuation control.

Specifically, on the left side of FIG. 3B, the common light blocker 304 is at its most top position fully blocking the light beam from one of the fiber collimators and thus the VOA outputs a "dark" state (namely the other one of the fiber collimators receives nothing). At this position, the IR sensor is fully open and its photo-current reaches a maximum value. Conversely, the common light blocker 304 can be actuated to move vertically downward to let a portion of the collimated light beam reach the other one of the collimators and at the same time, the IR sensor will be partially blocked or its photo-current is reduced from the previous level. On the right side of FIG. 3B, the common light blocker 304 is placed at the most bottom position where the light beam is coupled from one of the collimators to another with no attenuation. At the same time, the IR sensor reaches its "dark" state with no photocurrent. This relationship between the light attenuation of the VOA and the magnitude of the photocurrent from the IR sensor can be a fixed. In one embodiment, the relationship is stored in a control circuit or device as a reference to correct a light blocking status if the movement introduced an error. The relationship can also be used to calculate how much attenuation has been introduced to the light beam.

Figure 4B:
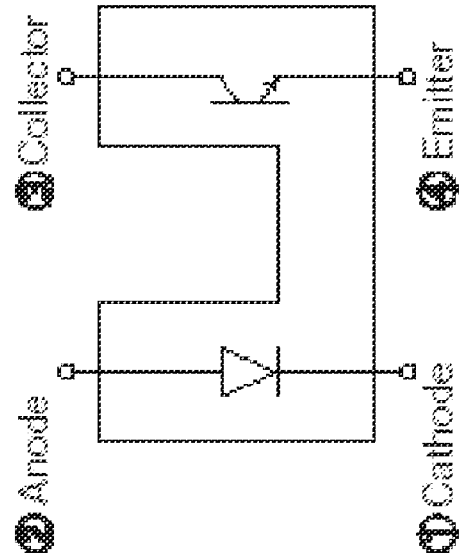
FIG. 4B shows a corresponding electronic structure of the assembly of FIG. 2A.
Figure 4A:
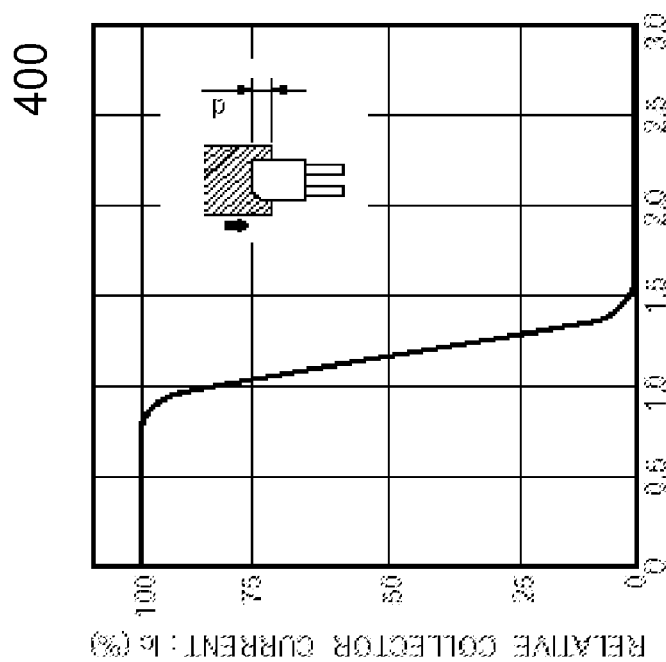
FIG. 4A shows an exemplary photocurrent curve.
Figure 6:
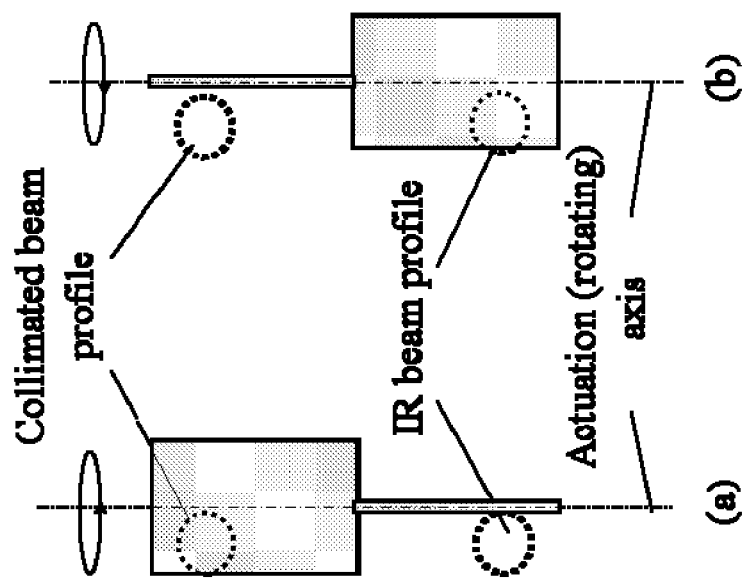
FIG. 6A and FIG. 6B show together another embodiment of rotating a common light blocker about an axis.

FIG. 4A shows an exemplary photocurrent curve 400 and FIG. 4B shows the corresponding electronic structure 402 of the assembly 200 of FIG. 2A. What is not shown in FIG. 4A is that a feed-back loop (e.g., a circuit) in which the photocurrent can be processed and used to control the movement of the common light blocker 304 to refine the attenuation through some miner blocker position adjustment.

Figure 5:
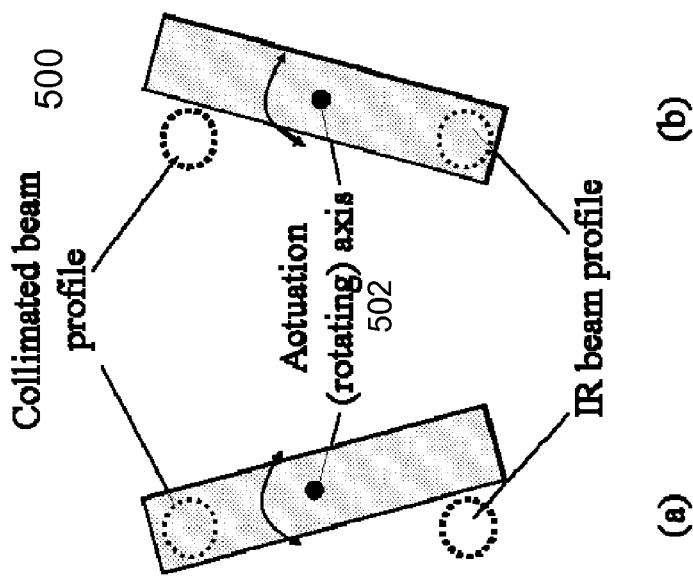
FIG. 5 shows, respectively, two movements, each of which demonstrates that a common light blocker has a rotational axis as indicated.
Figure 8:
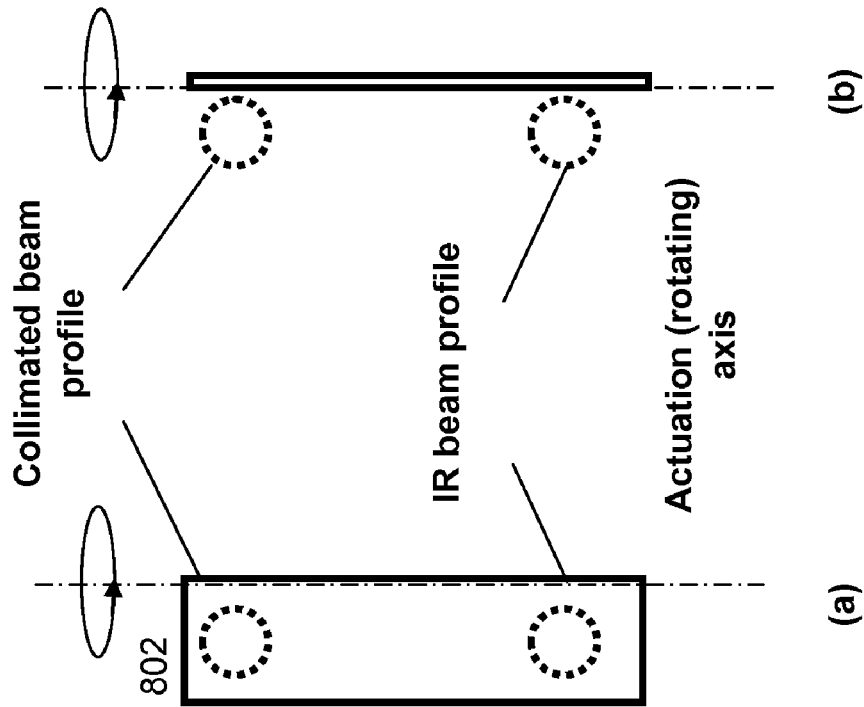
FIG. 8A and FIG. 8B shows another embodiment providing the reverse attenuation relationship.
Figure 7:
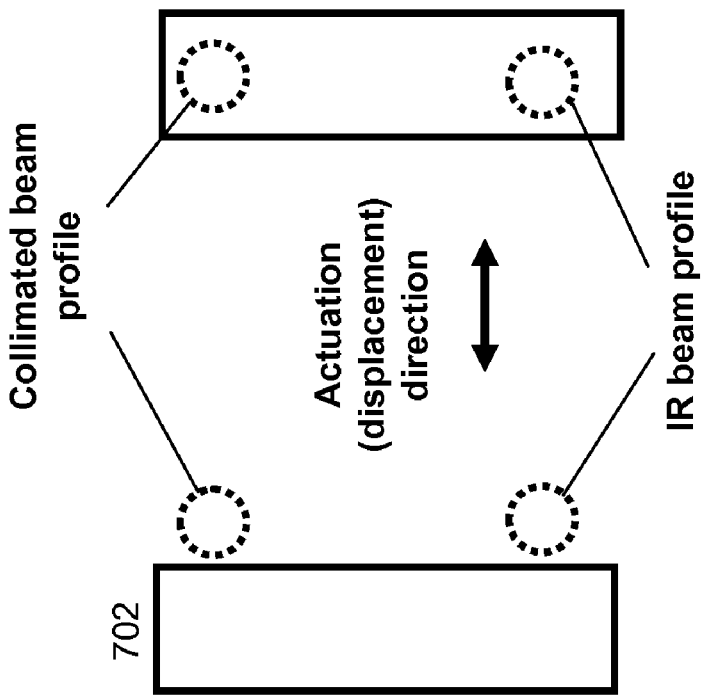
FIG. 7A and FIG. 7B show what is referred to herein as reverse attenuation.
Figure 9:
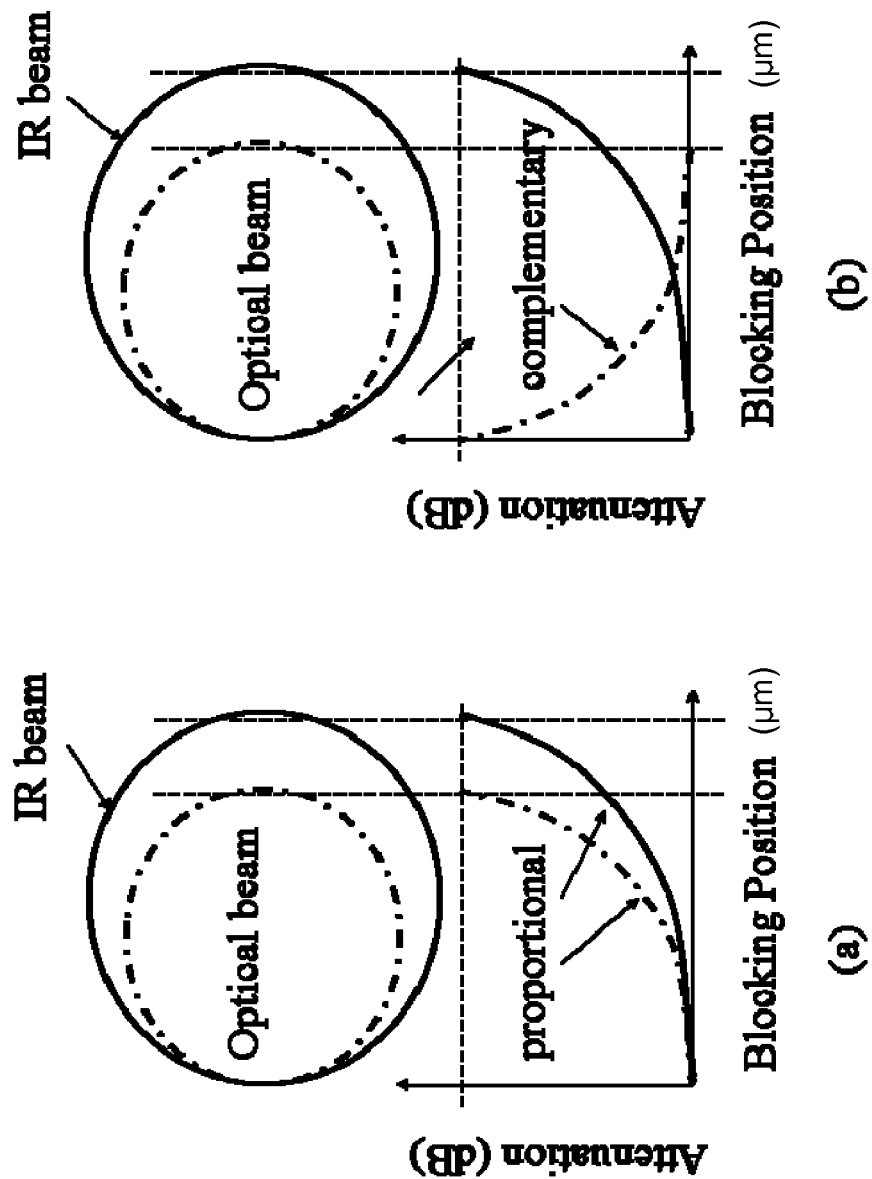
FIG. 9A and FIG. 9B show, respectively, two cases in which the diameter of the IR beam is either larger or smaller than that of the optical beam.

In another embodiment of the invention, the common light blocker 304 is actuated with a rotational movement such as by a DC motor or stepping motor. FIG. 5 shows, respectively, two movements 500, each of which demonstrates that a common light blocker has a rotational axis as indicated. The light blocking is performed complementarily in the same way as described above. On the left side of FIG. 5, the common light blocker 502 rotates anticlockwise so that the light beam from the collimator is blocked while the IR beam goes directly to the IR sensor so that a maximum value of the photocurrent from the IR sensor is produced. On the right side of FIG. 5, the common light blocker 502 rotates clockwise so that the light beam from the collimator is unblocked while the IR beam is blocked so that a minimum value of the photocurrent from the IR sensor is produced.

FIG. 6A and FIG. 6B show together another embodiment of rotating a common light blocker about an axis. The common light blocker includes two opaque plates positioned along an axis but orthogonally. So when one plate is blocking the light bean from the collimator, the other plate is not blocking the IR beam as shown in FIG. 6A. Similarly, when one plate is not blocking the light bean from the collimator, the other plate is blocking the IR beam as shown in FIG. 6B. Depending on the relative positions of the collimators and IR source and sensors, the common light blocker can have two fixed parts with an angle between them so that the rotation of the two fixed parts allows one beam to be blocked while the other passes. Those skilled in the art can appreciate that various designs surrounding this embodiment may be made to perform this complementary blocking function.

FIG. 7A and FIG. 7B show what is referred to herein as reverse attenuation. An opaque plate 702 is actuated with translational movement. In operation the plate 702 moves in to gradually block both the collimated light beam and the IR beam at the same time. Given the photocurrent from the IR sensor, it can be readily determined how much attenuation has been introduced to the collimated light beam. Specifically, FIG. 7A shows an extreme case in which the opaque plate 702 does not block anything. The opaque plate 702 is then attenuated to block some or all of the collimated light and the IR beam. FIG. 7B shows an extreme case in which the opaque plate 702 blocks both of the collimated light and the IR beam.

FIG. 8A and FIG. 8B shows another embodiment with the reverse relationship. An opaque plate 802 is mounted on a rotating axis. FIG. 8A shows that the opaque plate 802 is rotated to a position that blocks both of the collimated light and the IR beam. FIG. 8B shows that the opaque plate 802 is rotated to a position that does not block any of the collimated light and the IR beam. It can be understood that that the opaque plate 802 is rotated to a position that if the opaque plate 802 is rotated to a position between the two extreme cases shown in FIG. 8A and FIG. 8B, some portion of the collimated light and the IR beam will be blocked. In any case, based on the photocurrent from the IR sensor, it can be readily calculated how much attenuation has been introduced into the collimated light.

In reality, the IR beam and the collimated beam may not have an identical size (e.g., diameter) and thus the difference needs to be considered in order to optimize the performance. In FIG. 9A, it is assumed that the diameter of the IR beam size is larger than that of the collimated beam, two sets of curves are drawn to illustrate the proportional and the complementary relationships of the blocker. As shown in FIG. 9A, to reach to the same attenuation level, the larger beam would require a larger linear movement to cover the beam. In this case, the IR beam may not be fully blocked if there is an identical movement the common blocker in and out of the beam by translation of. The IR beam or the sensor signal curve may not be so steep when fine tuning the collimated beam at higher attenuation and thus its resolution may not be the same when controlling the high vs. low attenuation region of the VOA.

FIG. 9B shows a situation where a complementary relationship presents, the IR sensor is in the most sensitive state while the optical attenuation is at the low attenuation. On the other hand, When collimated signal is at the high attenuation state, the IR sensor is at a rather poor resolution state. Thus care must be exercised to match up the resolution to deliver the desired performance. Although plots of the situation where the diameter of the IR beam is smaller than that of the collimated beam are nor presented, those skilled in the art are readily ro produce these given the description herein.

Figure 11:
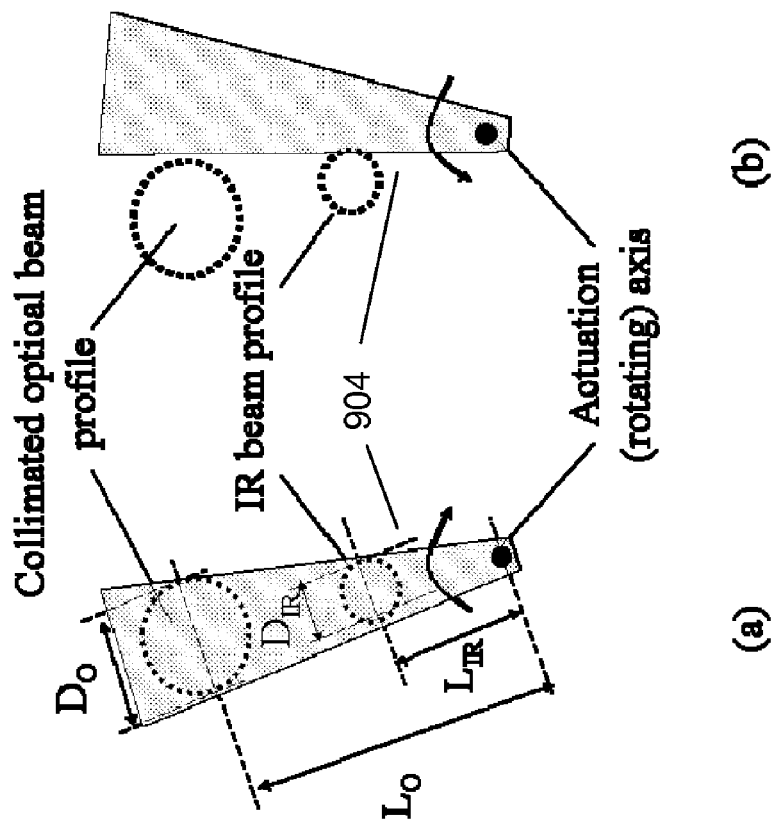
FIG. 11A and FIG. 11B show, respectively, two extreme cases in which an opaque plate is designed to carry a level of mechanical amplification
Figure 10:
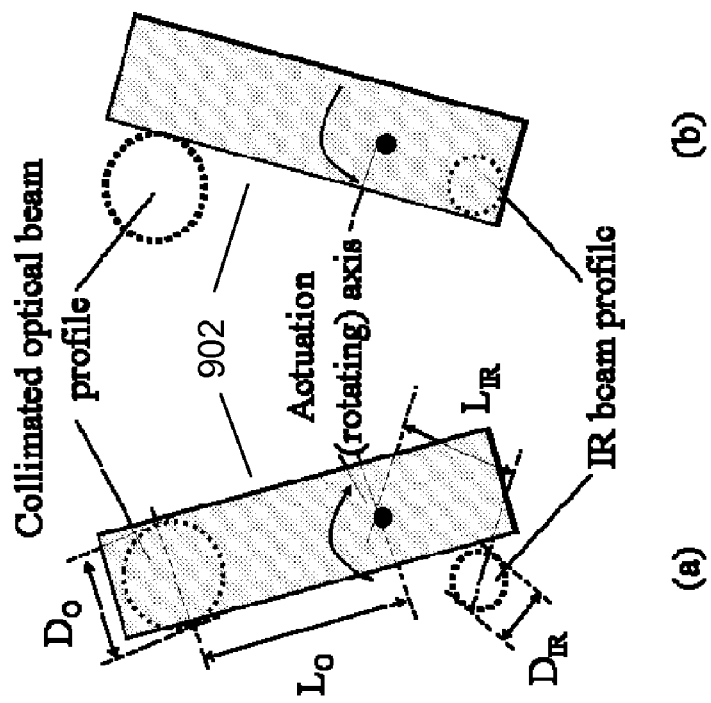
FIG. 10A and FIG. 10B show, respectively, two extreme cases in which an opaque plate is rotated around an axis that provides a level of mechanical amplification.

In order to enable the common blocker to block both of the IR beam and the collimated beam of different profile diameters with substantially similar rate (resolution), in one embodiment, the light blocker actuation is considered to include an amplification factor. For example, for a situation where the IR sensor has a smaller beam profile diameter $D_{IR}$ while the VOA's collimated beam has a larger beam diameter $D_O$. To use a simple actuator to block both beams at the same rate, the blocker and actuator combination must use an amplification factor. In FIG. 10 and FIG. 11, simple amplification mechanisms are shown for the complementary and the portional blockings, respectively.

In particular, FIG. 10A shows that the rotation point in the opaque plate 902 is not in the middle. Because the diameter profile of the IR beam is smaller than that of the collimated beam, the rotation point is located towards the IR beam. As a result, the rotation of the opaque plate 902 towards the collimated beam is amplified. Those skilled in the art can appreciated that the rotation point can be precisely located in reference with the diameter profiles of the collimated and the IR beams. FIG. 10A shows an extreme case in which the collimated beam is fully blocked while the IR beam is not blocked. FIG. 10B shows an opposite extreme case in which the collimated beam is not blocked while the IR beam is fully blocked.

FIG. 11A shows another mechanical amplification in which the opaque plate 904 is shaped proportionally with the diameter profiles of the collimated and IR beams. As a result, when the opaque plate 904 rotates, the blocking is achieved with fairly equal rate on both of the collimated beam and the IR beam. FIG. 11A shows an extreme case in which the collimated beam is fully blocked while the IR beam is not blocked. FIG. 11B shows an opposite extreme case in which the collimated beam is not blocked while the IR beam is fully blocked.

Figure 12:
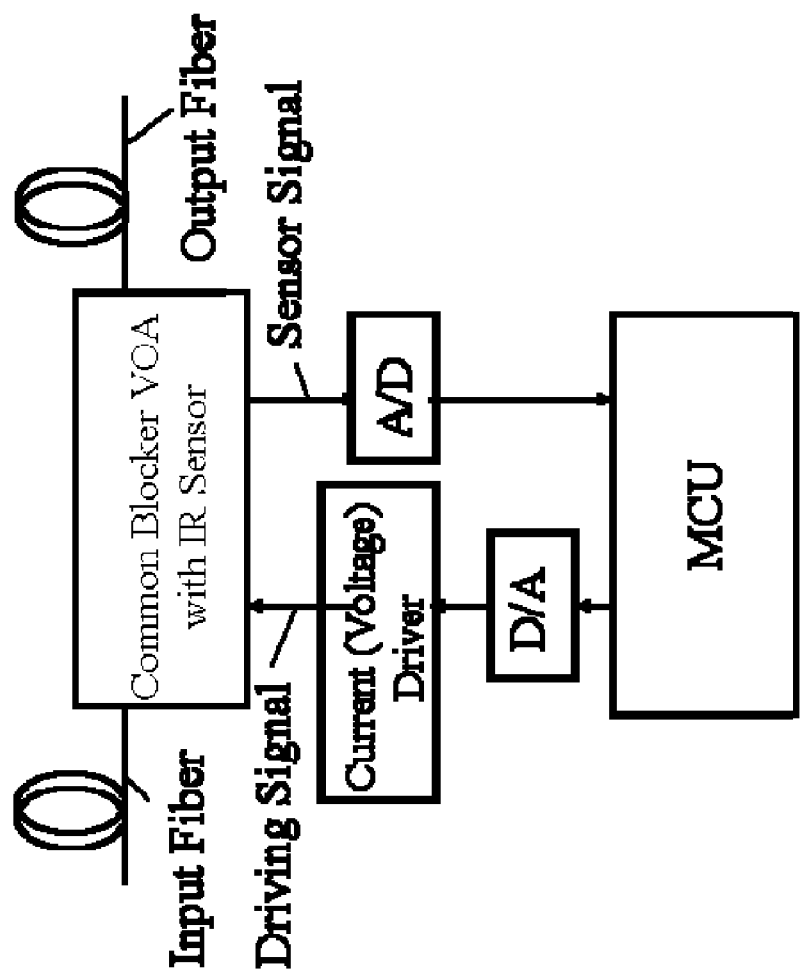
FIG. 12 shows a block diagram of an attenuator in accordance with one embodiment of the present invention.

Regardless how the opaque plate is rotated, amplification factor is generated using different arm lengths measured, respectively, from the rotating axis of the blocker to the center of the larger ($L_O$) beam and from the rotating axis of the blocker to the smaller ($L_{IR}$) beam center locations. It can be shown that the amplification can be achieved by putting the rotation axis or the arm length ratio between the two blocking positions with a relation FIG. 12 shows a block diagram of a controlling mechanism used in an attenuator 1200 in accordance with the present invention. The attenuator 1200 includes a blocker 1202, an analog-to-digital converter (A/D or ADC) 1204, an MCU (microcontroller) 1206, a digital-to-analog converter (D/A) 1208 and a driver 1210. In operation, a signal is taken from the blocker 1202 that may correspond to the assembly 200 of FIG. 2A. The assembly 200 produces a stable photocurrent proportional to the amount of the power of an IR beam being detected by the sensor 204. The photocurrent is digitized in the ADC 1204 and the digital signal is then analyzed in the MCU 1206. The MCU 1206 is configured to produce a signal in reference to the digitized photocurrent, where the signal is to be used, via the DAC 1208, to actuate the light blocker 206 to be moved up or down to attenuate the signal passing through the assembly 200.

Figure 13A:
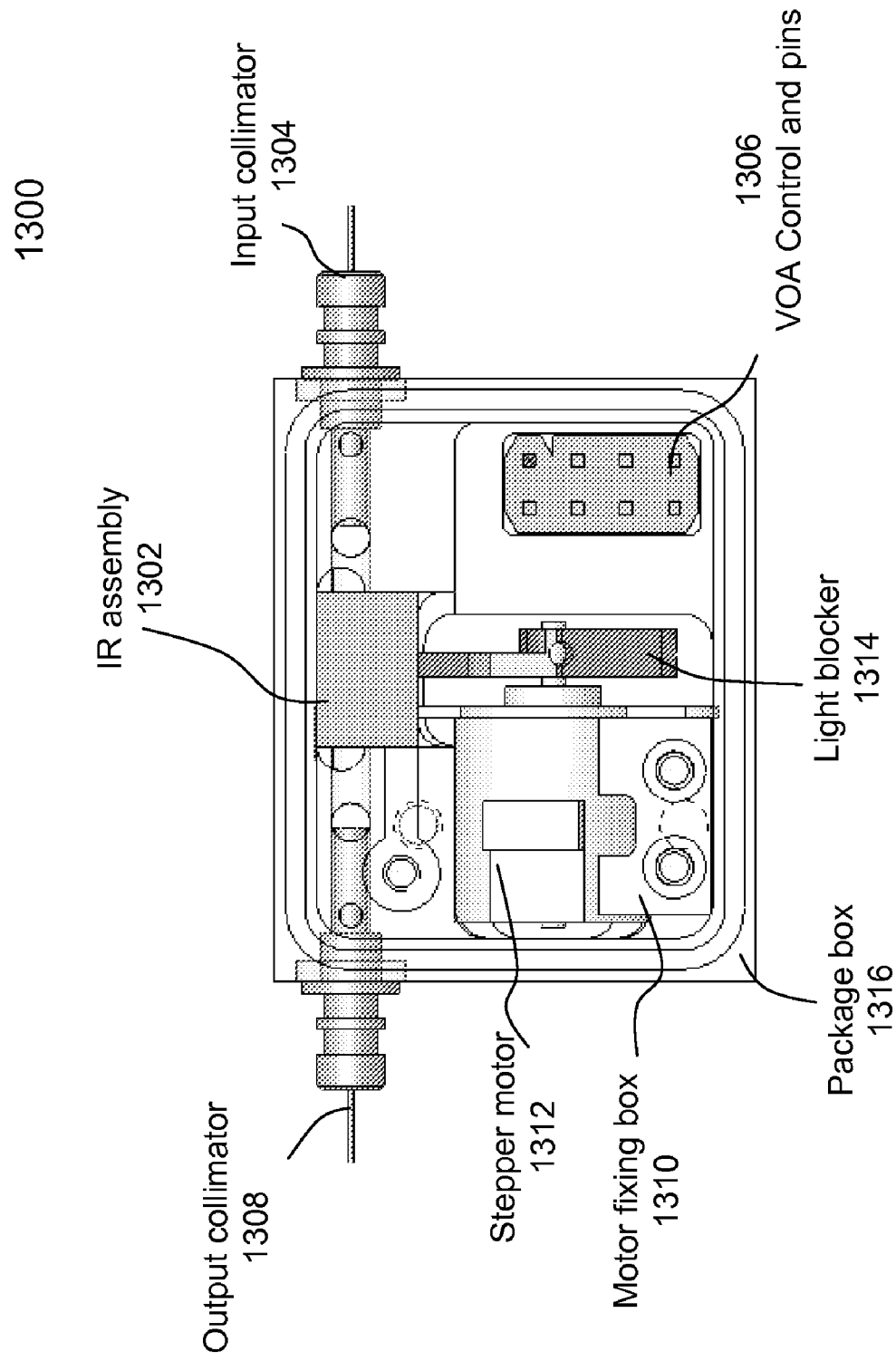
FIG. 13A shows an embodiment of an attenuator enclosed in a box or compact housing according to one embodiment of the present invention.

FIG. 13A shows an embodiment of an attenuator 1300 enclosed in a box according to one embodiment of the present invention. The attenuator 1300 includes the IR assembly 1302, an input collimator 1304, VOA control and pins 1306, an output collimator 1308, a motor fixing box 1310, a stepper motor 1312 and a light blocker 1314, all enclosed in a housing 1316.

To attenuate a light beam coupled in from the input collimator 1304, a motor driven mechanical arm (i.e., a light blocker) is used. The motor transfers a circular motion to a linear motion in order to gradually block the light beam and at the same time generates an IR sensor feedback reference signal. Similar to the U-structure used in FIG. 2A, the IR sensor is located at a fixed distance from the light beam in the IR assembly 1302, where the distance between the two are decided by the width of the common beam blocker 1314 and the angle of actuation the motor needs to supply. The stepper motor 1312 needs to be fixed stably so are the IR sensor and collimators as their geometrical positions must be kept fixed. The sensor feed-back signal and the motor driving signal can be coupled in by a closed-loop control either through an integrated circuit located inside the housing 1316 or they can be coupled in through connector pins as shown.

To facilitate the actuation operation, although a much more expensive DC motor could serve the purpose and it trivial to operate in analog mode, a low-cost stepper or stepping motor is preferably used. A stepping motor typically has a fixed number of steps within each of its 360° turn. Each a step has a few degrees depending on the number of steps it is designed with. A typical 20 step stepping motor as an example has a step angle $\beta=18°$. A collimated optical beam for a fiber collimator is typically about 300 um to 400 um in its beam profile diameter. Blocking of the entire beam from a completely open initial position would take 2°-3° for a rotating arm of about 1 cm in length. For a high-resolution operation of EVOA, this 2°-3° rotational range needs to be finely divided and precisely controlled. Such a fine control can only be sustained using an analog actuator with a stable control circuit. One feature of the stepping motor is its analog operation nature for intra-stepping operation, i.e. within its step, the motor angular position is decided by its driving current tuning angle $\alpha_M$, i.e., $\alpha_M=0.5\beta(I_{C-D}/I_{A-B})$, where $I_{A-B}$ and $I_{C-D}$ are stepping motor orthogonal phase driving currents shown in FIG. 13B.

Figure 13C:
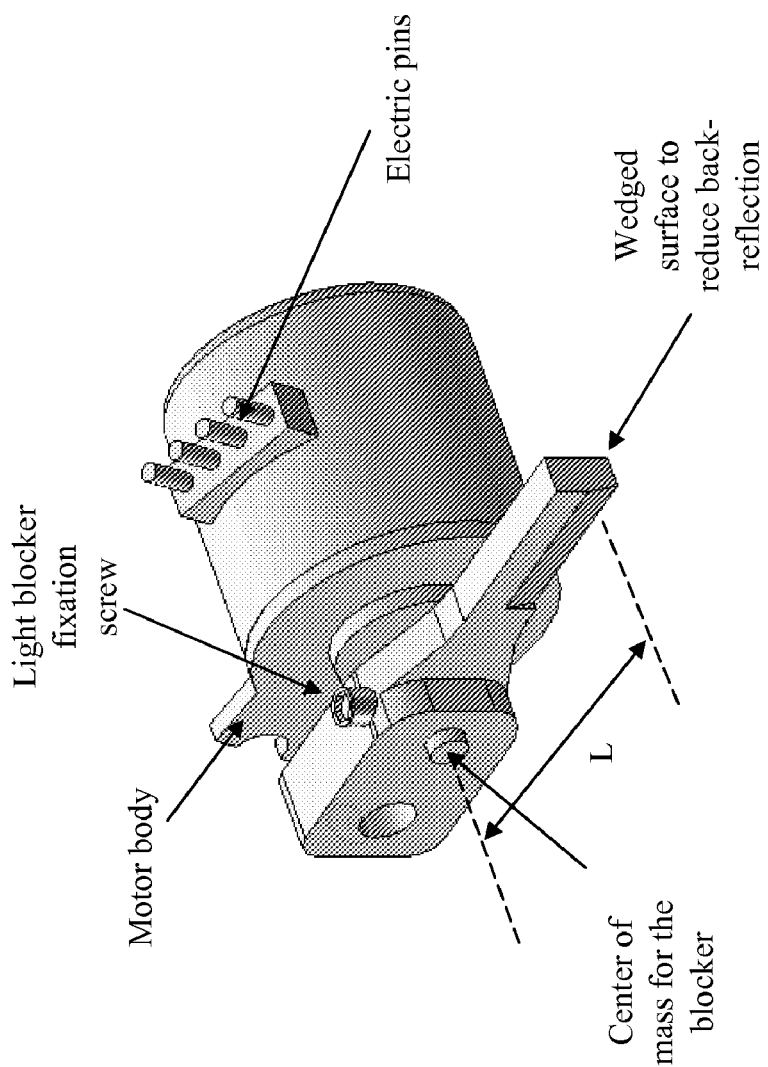
FIG. 13C shows that a light blocker is designed in such a way that its center of mass is located at an axial hole for motor shaft installment.
Figure 13B:
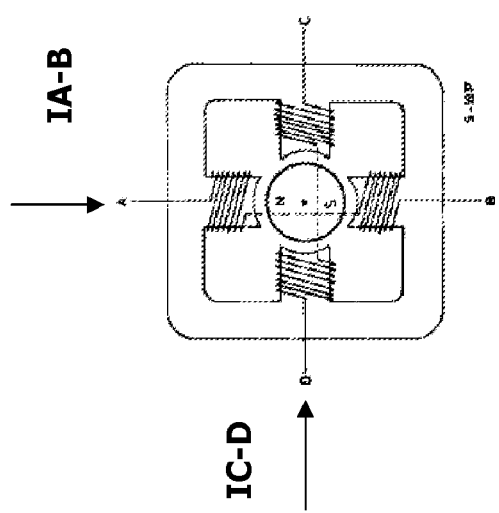
FIG. 13B illustrates two stepping motor orthogonal phase driving currents $I_{A-B}$ and $I_{C-D}$.

According to one embodiment, a light blocker is designed in such a way that its center of mass is located at the axial hole for motor shaft installment as shown in FIG. 13C. It is important to keep the center of mass at this location so that at any motor resting position, its shaft is bearing no extra external torque. Thus during a shock and vibrations, the light blocker would be sufficiently mechanically stable. The other important feature of the light blocker is that its surfaces are processed to form an oblique angle of larger than 8° in order to minimize the back-reflection into a fiber collimator.

In order to make the configuration of FIG. 13A work smoothly, in one embodiment, several design parameters need to be correctly chosen. First, to make sure a reliable feedback signal can be generated from the IR sensor, the light beam from the fiber collimator's beam waist at which the light blocker can block the beam to satisfy an XdB attenuation the EVOA is designed must have a relation to that of the IR sensor beam. Then, the width and length of the blocker must be chosen when a gap between the collimator and IR beam is fixed and such a selected width must be able to provide a full complementary operation and also satisfy the motor's maximum allowed intra-step rotating angle.

Figure 14A:
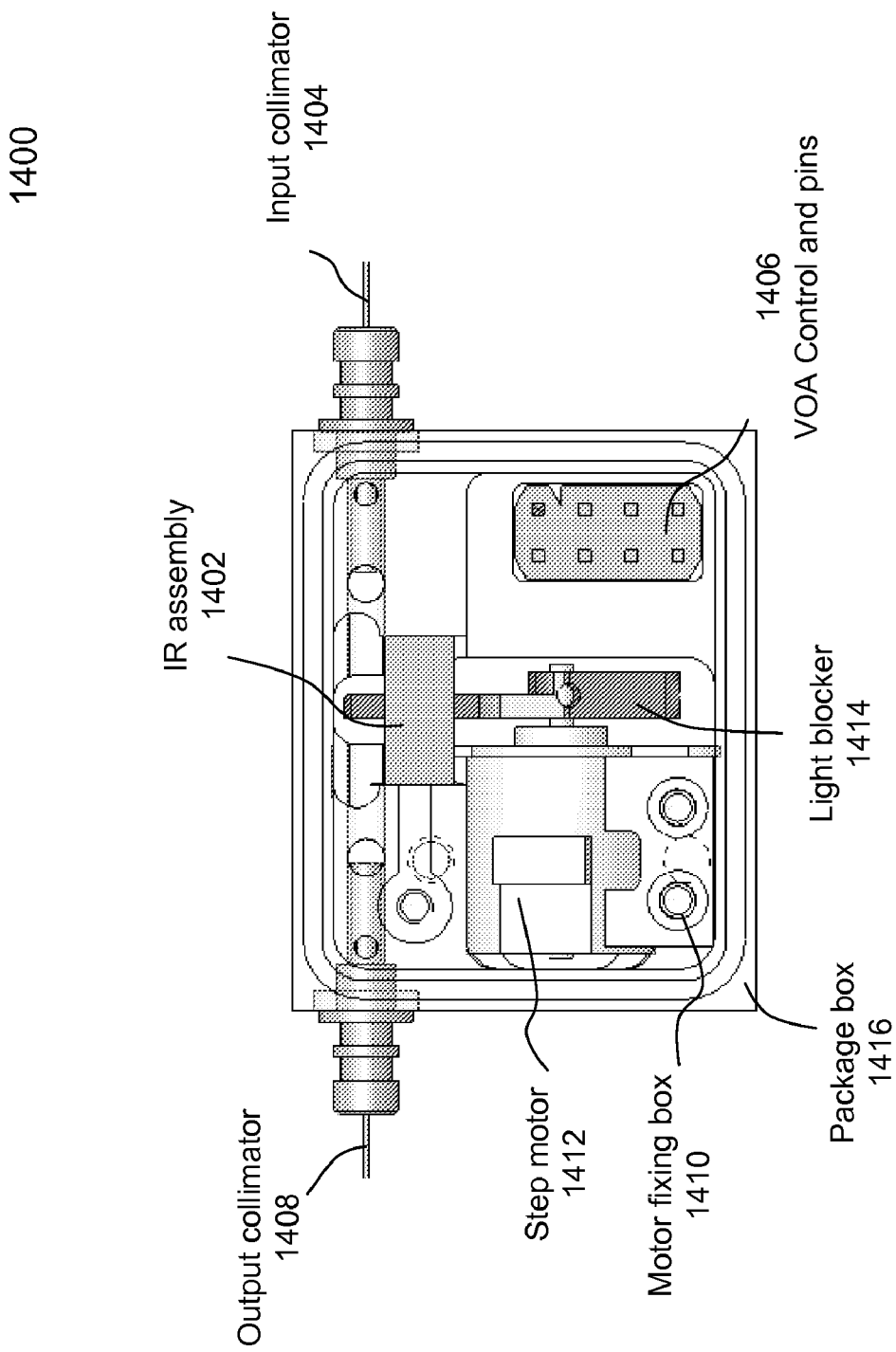
FIG. 14A shows another embodiment of the present invention, where most components are arranged similar to that shown in FIG. 13A except that the IR sensor is relocated to the same side of the light blocker arm (namely before the collimators)

FIG. 14A shows another embodiment of the present invention, where most components are arranged similar to that shown in FIG. 13A except that the IR sensor is relocated to the same side of the light blocker arm (namely before the collimators). The attenuator 1400 includes the IR assembly 1402, an input collimator 1404, VOA control and pins 1406, an output collimator 1408, a motor fixing box 1410, a stepper motor 1412 and a light blocker 1414, all enclosed in a housing 1416. Thus, when the blocker is actuated to attenuate the beam, it is cutting the IR sensor on the same side of the blade. With this arrangement, the IR sensor outputs and the EVOA light attenuation output value will not be in complemental way as shown in FIG. 13A. To illustrate the relation, FIG. 14B is provided to explain in graphics and plot, where while FIG. 14B shows the basic geometry of light blocking, FIG. 14C depicts the IR sensor photo current and VOA output in relation with the blocking angle $\alpha$ respectively.

According to one embodiment, the following design rules may be observed. First, once the optical collimator beam waist diameter $D_{SBC}$ is chosen, the blocker width W must be wider than $D_{SBC}$ to ensure a full attenuation. The blocker length selection depends on the motor effective tuning angle. Depending on the geometrical constraints that dictates the gap distance between $D_{SBC}$ and $D_{IR}$, the IR sensor beam waist diameter must satisfy a certain relation in order to guarantee its effectiveness to provide feedback signal for the entire attenuation range.

Figure 15:
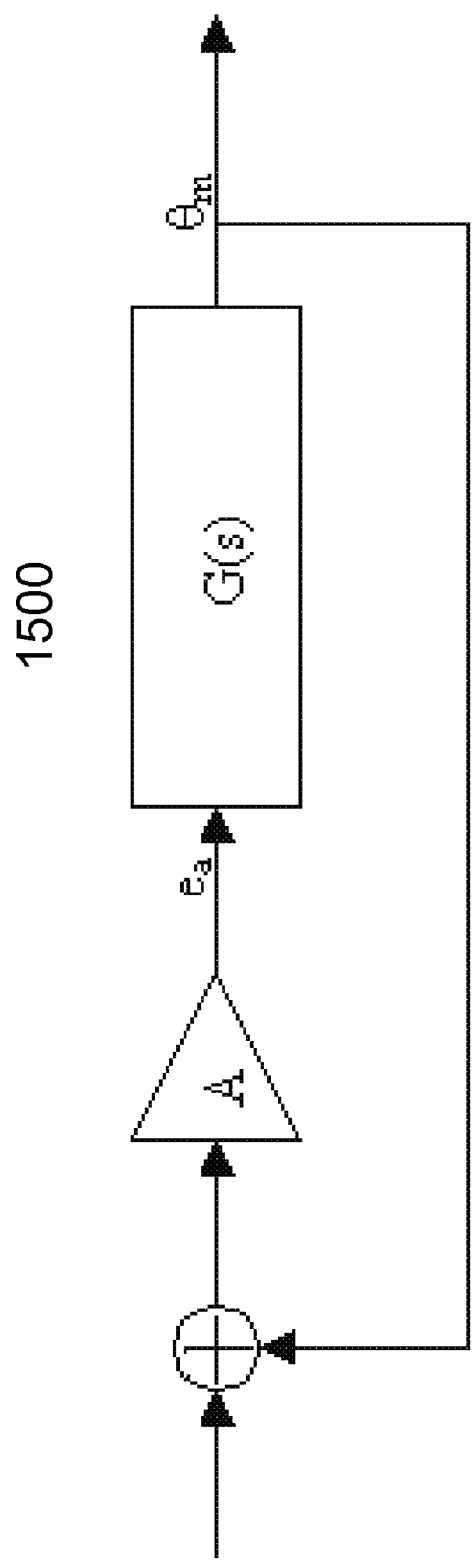
FIG. 15 shows a circuit model including a linear operational amplifier and can amplify an error signal between the VOA control signal and the sensor output signal.

FIG. 15 shows a circuit model 1500 including a linear operational amplifier and can amplify an error signal between the VOA control signal and the sensor output signal. The amplifier's error signal drives the stepping motor through a motor driving circuit. One feature is that when the motor is being driven, one of its two phases is connected to a fixed current source, while another phase current is variable depending on the output of closed-loop control. This closed-loop system can be represented as a simple model shown in FIG. 15, where A is the linear operational amplifier, ea is the output of amplifier, G(s) is the joint transfer function of the motor and IR sensor pair, which is a nonlinear and complex frequency based function due to the hysteresis of a typical motor. To make the control system stable, PI control parameters must be exercised to balance the hysteresis so that the control speed would not be too fast or too slow.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim:

1. An attenuator comprising:
    an enclosed case;
    an input collimator and an output collimator mounted though the case;
    a sensing assembly, housed in the case, including an IR source and an IR sensor, wherein the IR source projects an IR beam at the IR sensor; and
    a light blocker actuated by a motor to block some or all of the light beam projected from the input collimator to the output collimator according to an attenuation requirement, wherein a movement of the light blocker is sensed by detecting how much the IR beam is being blocked by the light blocker to indicate how much the light beam has been attenuated by the light blocker, wherein the sensing assembly outputs a photocurrent that is digitized for analysis in a microcontroller that in return provides a control signal to drive the motor controlling the light blocker.

2. The attenuator as recited in claim 1, wherein the light beam is not being branched out for measuring how much the light beam has been attenuated.

3. The attenuator as recited in claim 1, wherein the sensing assembly is a rigid structure that maintains a fixed distance between the IR source and the IR sensor.

4. The attenuator as recited in claim 3, wherein the movement of the light blocker blocks some or all of an IR beam projected from the IR source to the IR sensor.

5. The attenuator as recited in claim 4, wherein the motor is a stepper motor.

6. The attenuator as recited in claim 5, wherein the control signal is related to the attenuation requirement so as to cause the movement of the light blocker to be synchronized with an amount of the light beam to be attenuated.

7. The attenuator as recited in claim 6, wherein some or the entire IR beam is being blocked by the light blocker when some or the entire light beam is also being blocked by the light blocker.

8. The attenuator as recited in claim 7, wherein the movement of the light blocker is translational.

9. The attenuator as recited in claim 7, wherein the movement of the light blocker is rotational.

10. The attenuator as recited in claim 7, wherein the movement of the light blocker is regulated accordingly to a difference in diameters of the light beam and the IR beam.

11. The attenuator as recited in claim 7, wherein the movement of the light blocker is mechanically adjusted to maintain the light beam to be attenuated with a predefined resolution.

12. The attenuator as recited in claim 7, wherein the movement of the light blocker is mechanically adjusted to maintain the IR beam to be blocked with a predefined resolution.

13. The attenuator as recited in claim 4, wherein the IR sensor produces a photocurrent proportional to an amount of the IR beam being blocked.

14. The attenuator as recited in claim 4, wherein the IR sensor produces a photocurrent proportional to an amount of the IR beam projected from the IR source to the IR sensor.

15. The attenuator as recited in claim 4, wherein some or the entire IR beam is being blocked by the light blocker when some or the entire light beam is being unblocked by the light blocker.

16. The attenuator as recited in claim 15, wherein the movement of the light blocker is translational.

17. The attenuator as recited in claim 15, wherein the movement of the light blocker is rotational.

18. The attenuator as recited in claim 15, wherein the movement of the light blocker is regulated accordingly to a difference in diameters of the light beam and the IR beam.

19. The attenuator as recited in claim 15, wherein the movement of the light blocker is mechanically adjusted to maintain the light beam to be attenuated with a predefined resolution.

20. The attenuator as recited in claim 15, wherein the movement of the light blocker is mechanically adjusted to maintain the IR beam to be blocked with a predefined resolution.

21. The attenuator as recited in claim 1, wherein a light blocker is designed in such a way that its center of mass is located at an axial hole for motor shaft installment so that its shaft is bearing no extra external torque during a shock and vibrations.

* * * * *